United States Patent
Gavrilovski et al.

(10) Patent No.: US 11,840,933 B2
(45) Date of Patent: Dec. 12, 2023

(54) LIDAR BASED FOD DETECTION FOR GAS-TURBINE ENGINES

(71) Applicant: UNITED TECHNOLOGIES CORPORATION, Farmington, CT (US)

(72) Inventors: Alek Gavrilovski, West Hartford, CT (US); William Donat, Manchester, CT (US)

(73) Assignee: RTX CORPORATION, Farmington, CT (US)

(*) Notice: Subject to any disclaimer, the term of this patent is extended or adjusted under 35 U.S.C. 154(b) by 794 days.

(21) Appl. No.: 16/714,262

(22) Filed: Dec. 13, 2019

(65) Prior Publication Data

US 2021/0180466 A1    Jun. 17, 2021

(51) Int. Cl.
     *F01D 17/20*      (2006.01)
     *G01S 17/04*      (2020.01)
     *F01D 21/10*      (2006.01)
     *F02C 7/04*      (2006.01)
     *G01S 17/88*      (2006.01)

(52) U.S. Cl.
CPC ............ *F01D 17/20* (2013.01); *F01D 21/10* (2013.01); *F02C 7/04* (2013.01); *G01S 17/04* (2020.01); *G01S 17/88* (2013.01)

(58) Field of Classification Search
CPC . F01D 17/20; F01D 21/10; F02C 7/04; G01S 17/04; G01S 17/88
See application file for complete search history.

(56) References Cited

U.S. PATENT DOCUMENTS

| | | | |
|---|---|---|---|
| 9,776,731 B1 | 10/2017 | Lieberman et al. | |
| 9,909,971 B2 | 3/2018 | Knobloch et al. | |
| 10,759,543 B1* | 9/2020 | Haye | G01V 8/20 |
| 2010/0003121 A1 | 1/2010 | Berryann et al. | |
| 2015/0308346 A1* | 10/2015 | Di Domenico | F02C 7/04 |
| | | | 415/119 |
| 2016/0202168 A1 | 7/2016 | Knobloch et al. | |
| 2016/0216142 A1 | 7/2016 | deGaribody | |
| 2018/0298778 A1 | 10/2018 | Dischinger et al. | |
| 2021/0132197 A1* | 5/2021 | Wachter | G01S 17/931 |
| 2021/0163141 A1* | 6/2021 | Tetrault | B64D 15/16 |

FOREIGN PATENT DOCUMENTS

GB      2532585      6/2016

OTHER PUBLICATIONS

European Patent Office, European Search Report dated Apr. 23, 2021 in Application No. 20212584.5.

* cited by examiner

*Primary Examiner* — Georgia Y Epps
*Assistant Examiner* — Don J Williams
(74) *Attorney, Agent, or Firm* — Snell & Wilmer L.L.P.

(57) ABSTRACT

A foreign object debris (FOD) detection system for a gas turbine engine comprises a light detection and ranging (LiDAR) sensor assembly. The LiDAR sensor assembly is configured to scan a pre-determined volume within an inlet of the gas turbine engine. The inlet may be defined by a nacelle of the gas turbine engine. The LiDAR sensor assembly may comprise a single transceiver, a transmitter and a receiver, a plurality of transmitters and a receiver, or a plurality of receivers and a transmitter.

18 Claims, 13 Drawing Sheets

LIDAR BASED FOD DETECTION FOR GAS-TURBINE ENGINES

FIELD

This disclosure relates generally to gas turbine engines, and more particularly to a foreign object debris (FOD) detection system for gas-turbine engines.

BACKGROUND

Gas turbine engines typically include a fan section to drive inflowing air, a compressor section to pressurize inflowing air, a combustor section to burn a fuel in the presence of the pressurized air, and a turbine section to extract energy from the resulting combustion gases. The fan section may include a plurality of fan blades coupled to a fan hub. Forward of the fan section typically includes an inlet. During operation of a gas turbine engine, foreign object debris (FOD) may enter the inlet and/or enter a gas turbine engine.

SUMMARY

A gas turbine engine is disclosed herein. The gas turbine engine may comprise a nacelle at least partially defining a boundary of an inlet of the gas turbine engine; a fan section disposed aft of the inlet; and a foreign object debris (FOD) detection system mounted to a radially inner surface of the nacelle; the FOD detection system comprising a light detection and ranging (LiDAR) sensor assembly configured to scan a pre-determined volume within the inlet.

In various embodiments, the gas turbine engine may further comprise an FOD detection processor electrically coupled to the LiDAR sensor assembly, the FOD detection processor configured to transfer a control signal to increase a resolution in a local area of a tracking zone in response to detecting FOD in the local area. The LiDAR sensor assembly may comprise a single transceiver configured to scan the pre-determined volume within the inlet. The LiDAR sensor assembly may comprise a plurality of transceivers, wherein each transceiver in the plurality of transceivers is fixed, the plurality of transceivers configured to scan the pre-determined volume. The plurality of transceivers may be disposed in an array. The LiDAR sensor assembly may further comprise a plurality of transmitters and a receiver, each transmitter in the plurality of transmitters configured to emit a pulsed beam sequentially following an adjacent transmitter in the plurality of transmitters. The plurality of transmitters may be disposed in an array. The LiDAR sensor assembly may further comprise a plurality of receivers and a transmitter, wherein each receiver is configured to detect a reflection from a pre-determined direction. The plurality of receivers may be disposed in an array.

A gas turbine engine is disclosed herein. The gas turbine engine may comprise: an engine core; an inlet disposed forward of the engine core, the inlet comprising a centerbody; and a foreign object debris (FOD) detection system mounted to the centerbody; the FOD detection system comprising a first light detection and ranging (LiDAR) sensor assembly configured to scan a first pre-determined volume within the inlet, the first pre-determined volume defining at least one of a first volume forward of the centerbody and a second volume radially outward of the centerbody.

In various embodiments, the gas turbine engine may further comprise a second LiDAR sensor assembly coupled to the centerbody. The first pre-determined volume may be the first volume. The second LiDAR sensor assembly may be configured to scan a second pre-determined volume, and the second pre-determined volume may be the second volume. The first LiDAR sensor assembly may be configured to detect and track FOD during operation of the gas turbine engine. The gas turbine engine may further comprise an FOD detection processor electrically coupled to the first LiDAR sensor assembly, and the first LiDAR sensor assembly may comprise a plurality of transceivers. The FOD detection processor may be configured to increase a first resolution of a first portion of transceivers in the plurality of transceivers in response to a transceiver in the plurality of transceivers detecting the FOD. The FOD detection processor may be configured to decrease a second resolution of a second portion of transceivers in the plurality of transceivers in response to the transceiver in the plurality of transceivers detecting the FOD. The second portion of transceivers may be different than the first portion of transceivers. The gas turbine engine may further comprise an FOD detection processor electrically coupled to the first LiDAR sensor assembly. The first LiDAR sensor assembly may comprise a plurality of transmitters and a receiver. The FOD detection processor may be configured to increase a first resolution of a first portion of transmitters in the plurality of transmitters in response to a transmitter in the plurality of transmitters detecting the FOD. The FOD detection processor may be configured to decrease a second resolution of a second portion of transmitters in the plurality of transmitters in response to the transmitter in the plurality of transmitters detecting the FOD. The second portion of transmitters may be different than the first portion of transmitters.

A method of using a foreign object debris (FOD) detection system for a gas turbine engine is disclosed herein. The method may comprise: detecting FOD in an inlet of the gas turbine engine; increasing a first resolution of a first portion of transmitters or receivers in a plurality of transmitters or transceivers; and tracking the FOD through a pre-determined volume defined by the plurality of transmitters or transceivers.

In various embodiments, the method may further comprise decreasing a second resolution of a second portion of transmitters or transceivers in the plurality of transmitters or transceivers. The second portion of transmitters or transceivers being different than the first portion of transmitters or transceivers.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). As used herein, "transmit" may include sending electronic data from one system component to another via electronic communication between the components. Additionally, as used herein, "electronic data" may include encompassing information such as commands, queries, files, data for storage, and the like in digital or any other form.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1A:
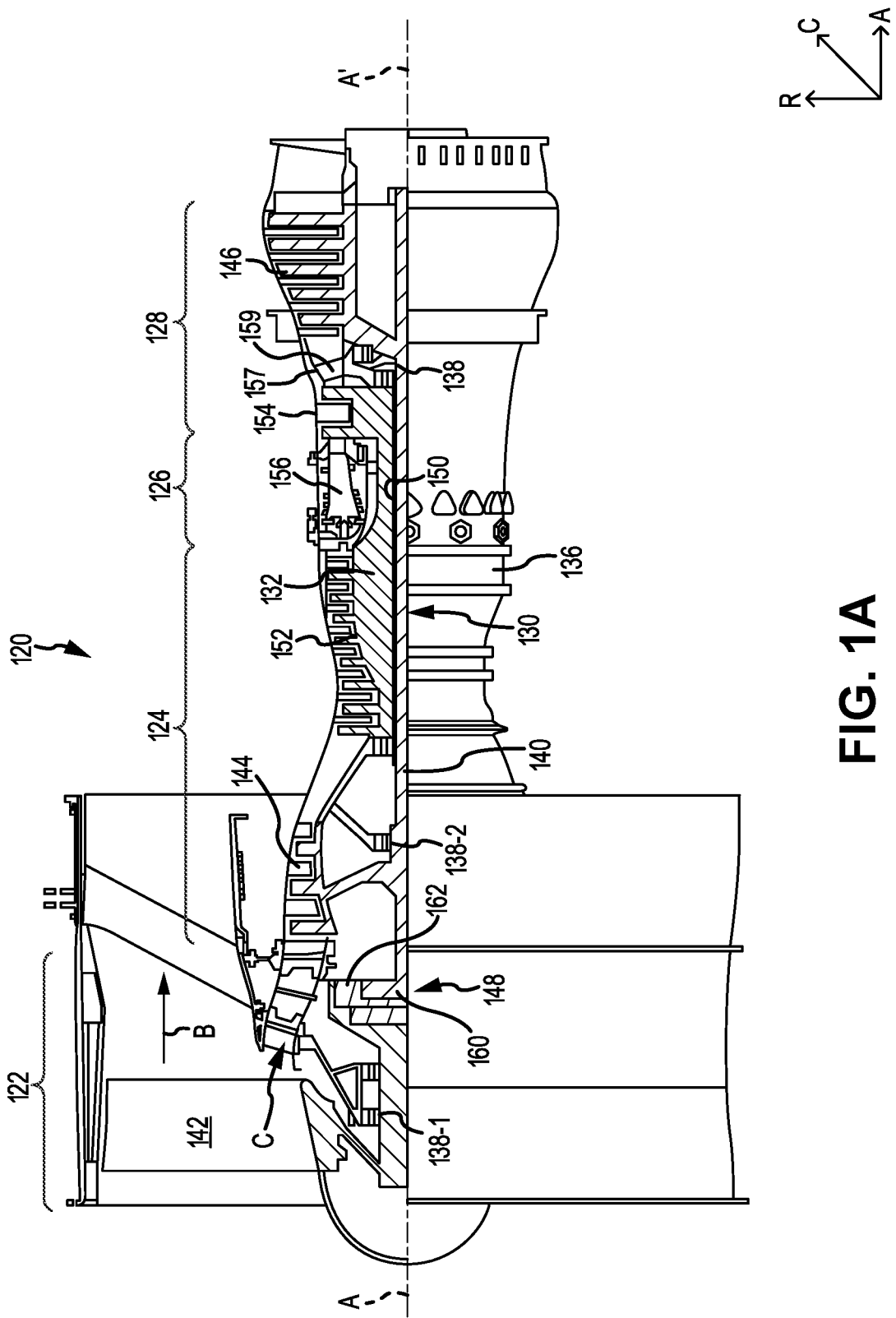
FIG. 1A illustrates a cross-section view of a gas turbine engine, in accordance with various embodiments.

In various embodiments, and with reference to FIG. 1A, a gas turbine engine 120 is disclosed. As used herein, "aft" refers to the direction associated with a tail (e.g., the back end) of an aircraft, or generally, to the direction of exhaust of gas turbine engine 120. As used herein, "forward" refers to the direction associated with a nose (e.g., the front end) of the aircraft, or generally, to the direction of flight or motion. An A-R-C axis has been included throughout the figures to illustrate the axial (A), radial (R) and circumferential (C) directions. For clarity, axial axis A spans parallel to engine central longitudinal axis A-A'. As utilized herein, radially inward refers to the negative R direction towards engine central longitudinal axis A-A', and radially outward refers to the R direction away from engine central longitudinal axis A-A'.

Gas turbine engine 120 may comprise a two-spool turbofan that generally incorporates a fan section 122, a compressor section 124, a combustor section 126, and a turbine section 128. In operation, fan section 122 may drive air along a bypass flow-path B, while compressor section 124 may further drive air along a core flow-path C for compression and communication into combustor section 126, before expansion through turbine section 128. FIG. 1A provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 120 may comprise a low speed spool 130 and a high speed spool 132 mounted for rotation about an engine central longitudinal axis A-A' relative to an engine static structure 136 via one or more bearing systems 138 (shown as, for example, bearing system 138-1 and bearing system 138-2 in FIG. 1A). It should be understood that various bearing systems 138 at various locations may alternatively or additionally be provided, including, for example, bearing system 138, bearing system 138-1, and/or bearing system 138-2.

In various embodiments, low speed spool 130 may comprise an inner shaft 140 that interconnects a fan 142, a low pressure (or a first) compressor section 144, and a low pressure (or a second) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 may couple inner shaft 140 to a rotating fan structure. High speed spool 132 may comprise an outer shaft 150 that interconnects a high pressure compressor ("HPC") 152 (e.g., a second compressor section) and high pressure (or a first) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128.

Inner shaft 140 and outer shaft 150 may be concentric and may rotate via bearing systems 138 about engine central longitudinal axis A-A'. As used herein, a "high pressure" compressor and/or turbine may experience a higher pressure than a corresponding "low pressure" compressor and/or turbine.

In various embodiments, the air along core airflow C may be compressed by low pressure compressor 144 and HPC 152, mixed and burned with fuel in combustor 156, and expanded over high pressure turbine 154 and low pressure turbine 146. Mid-turbine frame 157 may comprise airfoils 159 located in core airflow path C. Low pressure turbine 146 and high pressure turbine 154 may rotationally drive low speed spool 130 and high speed spool 132, respectively, in response to the expansion.

In various embodiments, gas turbine engine 120 may comprise a high-bypass ratio geared aircraft engine. The bypass ratio of gas turbine engine 120 may also be greater than ten (10:1). Geared architecture 148 may be an epicyclic gear train, such as a star gear system (sun gear in meshing engagement with a plurality of star gears supported by a carrier and in meshing engagement with a ring gear) or other gear system. Geared architecture 148 may have a gear reduction ratio of greater than about 2.3 and low pressure turbine 146 may have a pressure ratio that is greater than about five (5). The diameter of fan 142 may be significantly larger than that of the low pressure compressor section 144, and the low pressure turbine 146 may have a pressure ratio that is greater than about five (5:1). The pressure ratio of low pressure turbine 146 is measured prior to inlet of low pressure turbine 146 as related to the pressure at the outlet of low pressure turbine 146. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in high pressure compressor 152 than are conventionally experienced. These higher operating temperatures and pressure ratios create operating environments that cause thermal loads that are higher than the thermal loads conventionally experienced, which may shorten the operational life of current components.

Figure 1B:
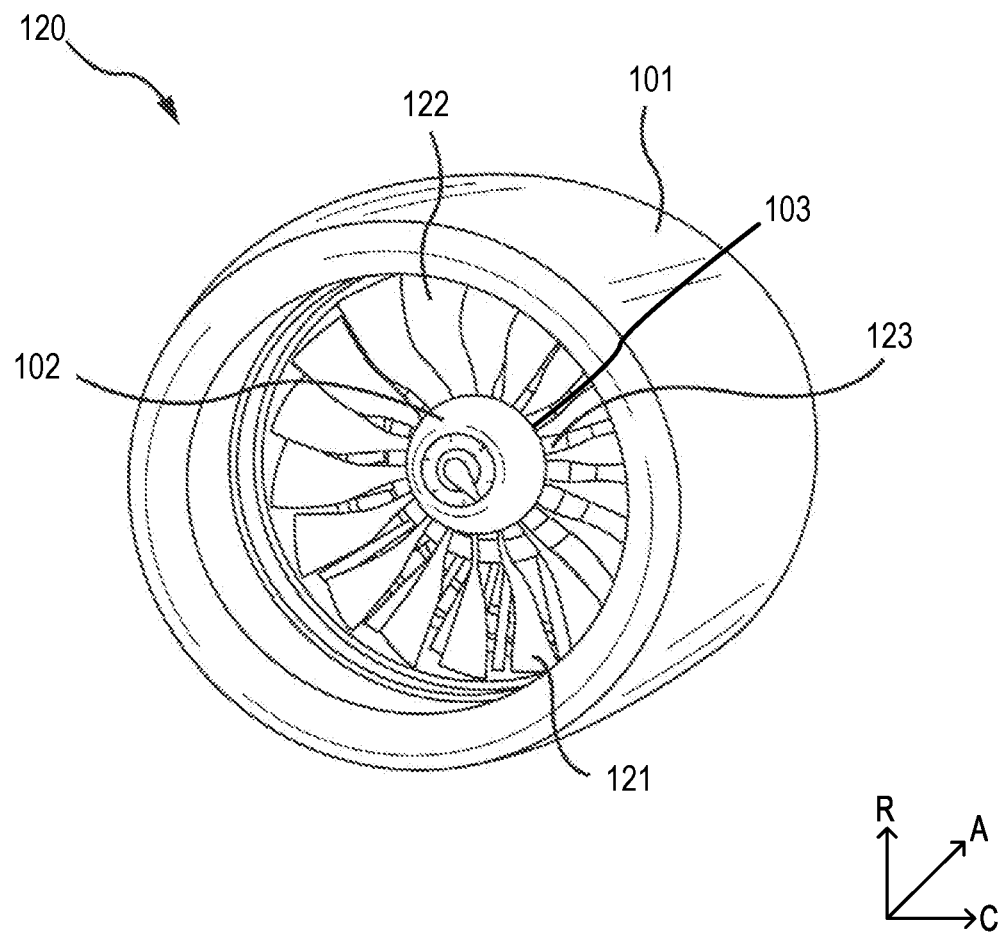
FIG. 1B illustrates a perspective view of a front portion of a gas turbine engine, in accordance with various embodiments.

In various embodiments, and with reference to FIG. 1B, a perspective view of a front portion of gas turbine engine 120 is depicted in greater detail. Gas turbine engine 120 may comprise a nacelle 101, fan section 122, and nose cone 102. Fan section 122 may comprise a plurality of circumferentially arranged fan blades 121. Fan platforms 123, or spacers, may be arranged between adjacent fan blades 121. Fan blades 121 may be mounted to a fan hub 103 located radially inward of fan platforms 123. Nose cone 102 may be arranged forward of fan blades 121 to provide an aerodynamic flow path through fan section 122 along with fan platforms 123.

Figure 2A:
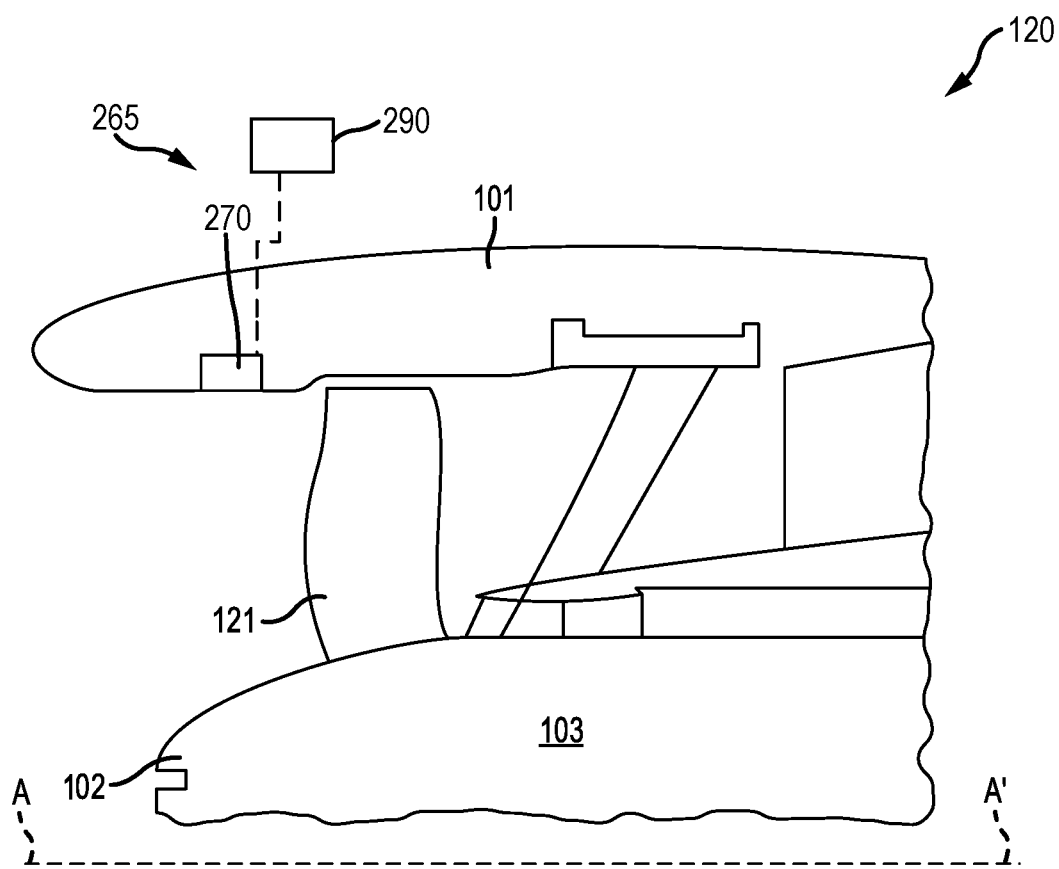
FIG. 2A illustrates a cross-section, schematic view of a gas turbine engine, in accordance with various embodiments.

In various embodiments, and with reference to FIG. 2A, a foreign object debris (FOD) detection system 265 is disclosed. FOD detection system 265 may be configured to track FOD that has entered the inlet of a gas turbine engine. For example, FOD detection system 265 may be used to detect an elevation, azimuth and duration of FOD that has entered the inlet by scanning a pre-determined volume forward of fan blades 121. The present disclosure may improve FOD detection, and accuracy of FOD size and trajectory during operation of gas turbine engine 120, allowing for more accurate maintenance and/or inspection schedules of engine blades. Although the present disclosure may make reference to FOD detection systems forward of fan blades 121, it should be understood by one skilled in the art that the present disclosure extends to any potential FOD detection systems within gas turbine engine 120, and/or any other suitable engine.

In various embodiments, FOD detection system 265 may comprise various components to aid in FOD detection and/or tracking. For example, FOD detection system 265 may comprise a light detection and ranging (LiDAR) sensor assembly 270 and/or a FOD detection processor 290. FOD detection system 265 may be installed within nacelle 101 of gas turbine engine 120, as discussed further herein. In that respect, FOD detection system 265 may be coupled to nacelle 101 and may allow for FOD detection and/or tracking during operation of gas turbine engine 120. In various embodiments, FOD detection system 265 may also be removably inserted within nacelle 101.

In various embodiments, FOD detection system 265 may comprise FOD detection processor 290. FOD detection processor 290 may be in electronic communication with LiDAR sensor assembly 270. In various embodiments, FOD detection processor 290 may be integrated into computer systems onboard an aircraft, such as, for example, a full authority digital engine control (FADEC), an engine-indicating and crew-alerting system (EICAS), and/or the like. FOD detection processor 290 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, FOD detection processor 290 may comprise a processor configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

In various embodiments, FOD detection processor 290 may be configured to control FOD detection system 265. For example, FOD detection processor 290 may be configured to transfer a control signal to increase a resolution in a local area of a tracking zone in response to detecting FOD in the local area. FOD detection processor 290 may generate and transmit the control signal based on an input received from the LiDAR sensor assembly 270. The excitation control signal may comprise electronic instructions configured to cause the LiDAR sensor assembly 270 to pulse and/or scan a pre-determined volume in an inlet of the gas-turbine engine, as discussed further herein. The scan may be configured to concentrate on a local volume in response to detection of FOD. In various embodiments, the LiDAR sensor assembly 270 may be configured to sear a beam to various azimuths and elevations, send and receive a returned pulse at each azimuth and elevation (i.e., each grid point). The scan may be achieved via mechanical means, solid state means, or the like.

Figure 2B:
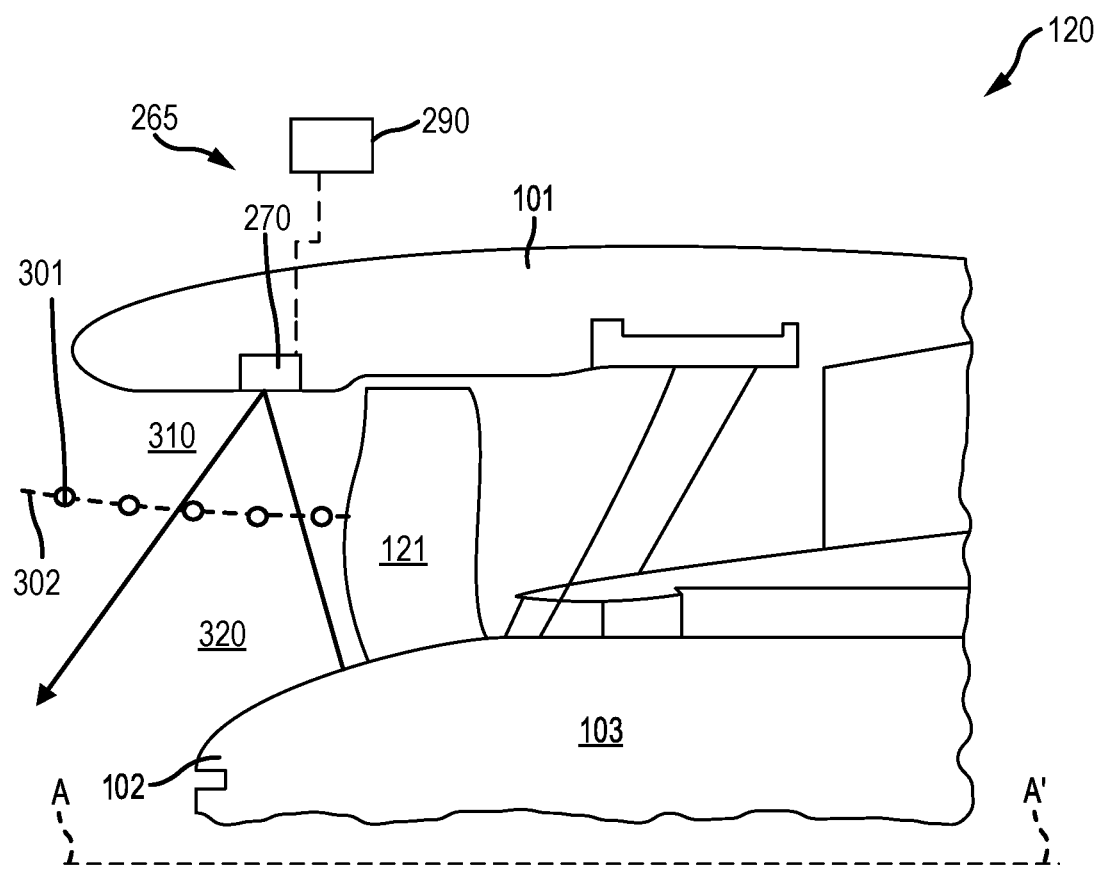
FIG. 2B illustrates a cross-section, schematic view of a gas turbine engine during operation, in accordance with various embodiments.

Referring now to FIG. 2B, a FOD detection system 265 for a gas turbine engine 120 during use is illustrated. In various embodiments, LiDAR sensor assembly 270 is configured to scan a pre-determined volume 320 within an inlet 310 of a gas turbine engine 120. The inlet 310 may be at least partially defined by nacelle 101, nose cone 102 and fan blades 121. In various embodiments, the LiDAR sensor assembly 270 may comprise a transceiver, a transmitter and receiver, or the like. The LiDAR sensor assembly 270 may be configured to rapidly transmit light. The light may be transmitted in various directions and define a pre-determined volume 320 in inlet 310. The light transmitted from the LiDAR sensor assembly 270 may reflect off a component in the inlet (e.g., the nose cone 102) and return to the LiDAR sensor assembly 270. The LiDAR sensor assembly 270 may be configured to receive the returned light via a transceiver, a receiver, or the like. The LiDAR sensor assembly 270 may be configured to measure the time it takes for the emitted light to travel to the component in the inlet 310 and back. The time may be used to calculate a distance via LiDAR sensor assembly 270. By scanning throughout pre-determined volume 320 in the inlet 310, the LiDAR sensor may define a spatial relation of components in the inlet 310 during normal operation of gas turbine engine 120. In doing so, LiDAR sensor may be configured to identify, detect, and/or track FOD 301 that enters inlet 310 along an FOD path 302.

Figure 3A:
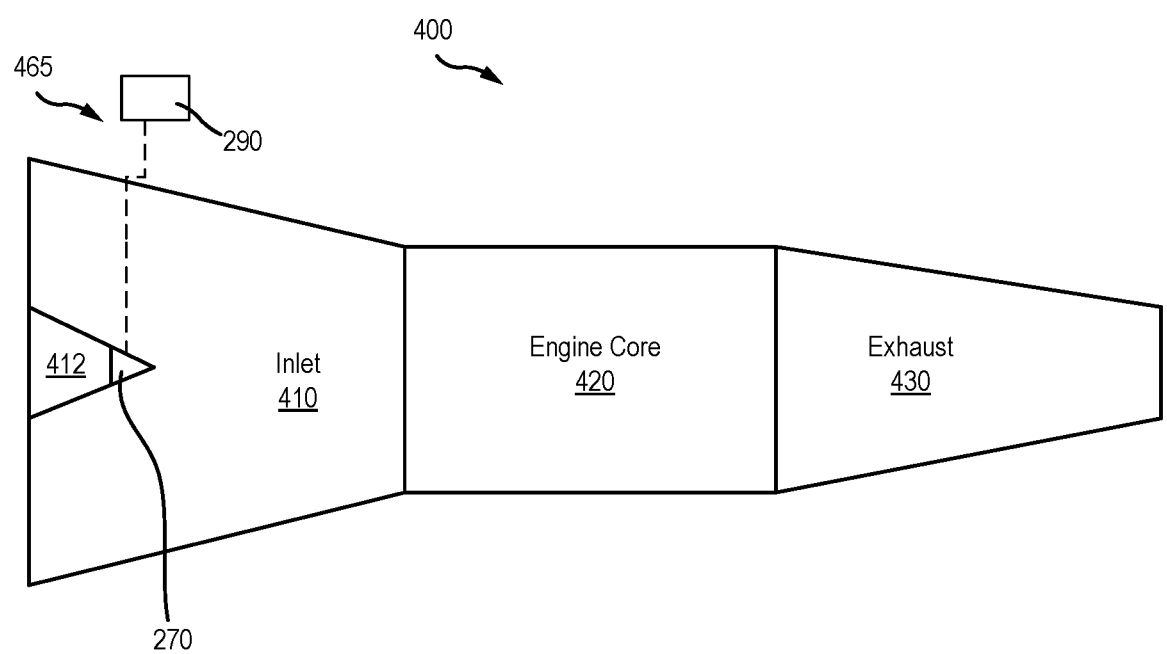
FIG. 3A illustrates a cross-section, schematic view of a gas turbine engine, in accordance with various embodiments.
Figure 3A:
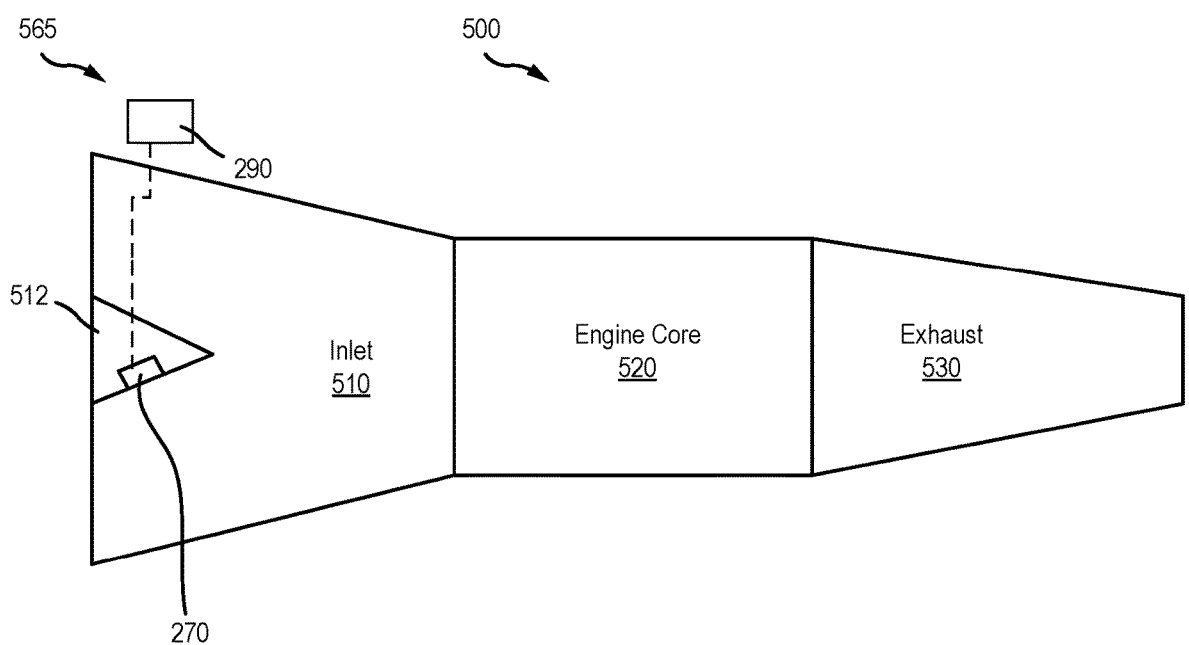

Referring now to FIG. 3A, a schematic view of a gas turbine engine 400 including a FOD detection system 465, in accordance with various embodiments is illustrated. FOD detection system 465 may comprise the LiDAR sensor assembly 270 and FOD detection processor 290. Gas turbine engine 400 comprises an inlet 410, an engine core 420, and an exhaust 430. In various embodiments, the inlet comprises a centerbody 412 disposed at a forward end of inlet 410. In various embodiments, LiDAR sensor assembly 270 may be coupled to the centerbody 412 of inlet 410 (e.g., a bifurcated inlet) and directed in the aft direction towards engine core 420. The LiDAR sensor assembly 270 may be configured to scan a volume aft of centerbody 412. By mounting the LiDAR sensor assembly 270 to centerbody 412, the LiDAR sensor assembly 270 may scan an entire volume of or substantially an entire volume of inlet 410 prior to entering engine core 420.

Figure 3B:
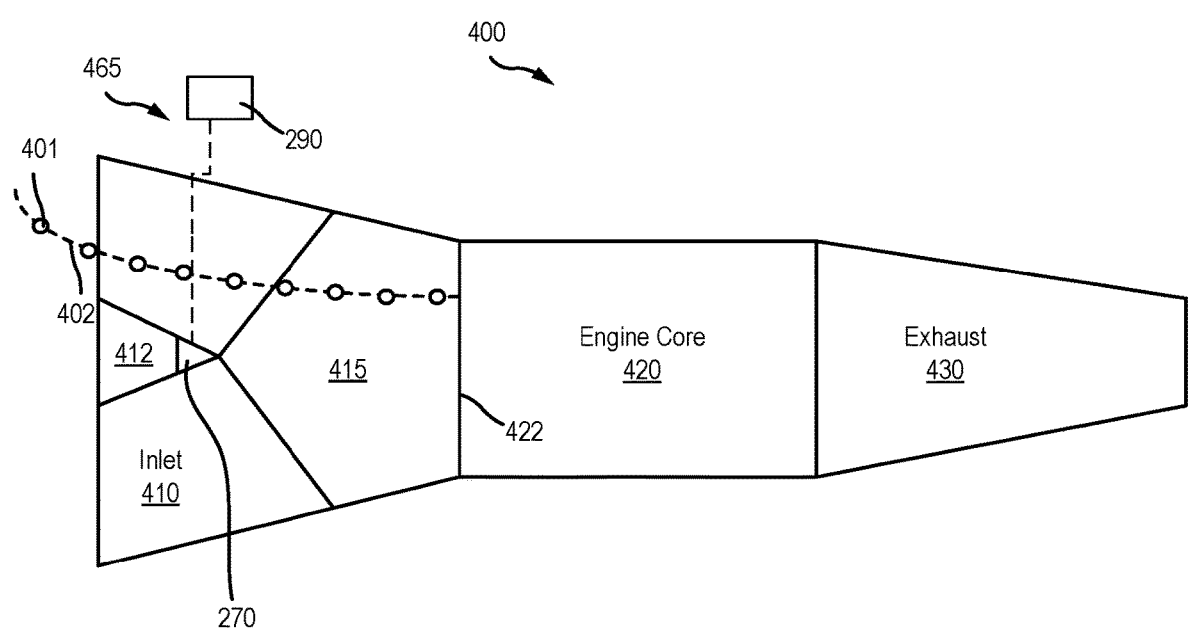
FIG. 3B illustrates a cross-section, schematic view of a gas turbine engine during operation, in accordance with various embodiments.

Referring now to FIG. 3B, an FOD detection system 465 for a gas turbine engine 400 during use is illustrated. In various embodiments, LiDAR sensor assembly 270 is configured to scan a pre-determined volume 415 within an inlet 410 of a gas turbine engine 400. In various embodiments, the LiDAR sensor assembly 270 may comprise a transceiver, a transmitter and receiver, or the like. The LiDAR sensor assembly 270 may be configured to rapidly transmit light. The light may be transmitted in various directions and define a pre-determined volume 415 in inlet 410. The light transmitted from the LiDAR sensor assembly 270 may reflect off an inner surface of inlet 410 and/or fan section 422 of engine core 420 and return to the LiDAR sensor assembly 270. The LiDAR sensor assembly 270 may be configured to receive the returned light via a transceiver, a receiver, or the like. The LiDAR sensor assembly 270 may be configured to measure the time it takes for the emitted light to travel to the inner surface of inlet 410 and/or the fan section 422 and back. The time may be used to calculate a distance via LiDAR sensor assembly 270.

By scanning throughout pre-determined volume 415 in the inlet 410, the LiDAR sensor assembly 270 may define a spatial relation of inlet 410 in the pre-determined volume 415 during normal operation of gas turbine engine 400. In doing so, LiDAR sensor assembly 270 may be configured to identify, detect, and/or track FOD 401 that enters inlet 410 along a FOD path 402 and travels through the pre-determined volume 415. The LiDAR sensor assembly 270 may be configured to target a local area within pre-determined volume 415 of inlet 410 when LiDAR sensor detects FOD 401. In doing so, LiDAR sensor may more accurately map and/or track FOD 401 as it travels along FOD path 402 and enters engine core 420.

Figure 4A:
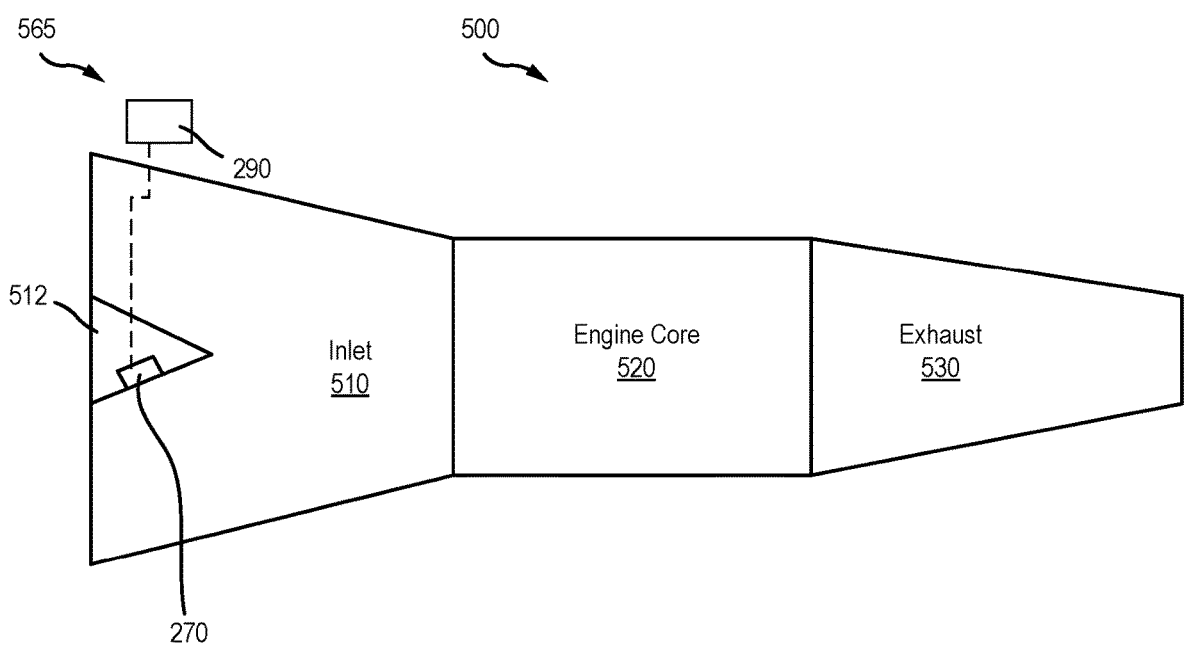
FIG. 4A illustrates a cross-section, schematic view of a gas turbine engine, in accordance with various embodiments.

Referring now to FIG. 4A, a schematic view of a gas turbine engine 500 including a FOD detection system 565, in accordance with various embodiments is illustrated. FOD detection system 565 may comprise LiDAR sensor assembly 270 and FOD detection processor 290. Gas turbine engine 500 comprises an inlet 510, an engine core 520, and an exhaust 530. In various embodiments, the inlet comprises a centerbody 512 disposed at a forward end of inlet 510. In various embodiments, LiDAR sensor assembly 270 may be coupled to the centerbody 512 of inlet 510 and directed RADIALLY outward towards an inner surface of inlet 510. The LiDAR sensor assembly 270 may be configured to scan a volume radially outward of centerbody 412. For example, LiDAR sensor may be configured to rotate about centerbody 512. By mounting the LiDAR sensor assembly 270 to centerbody 412, LiDAR sensor may scan an entire pre-determined volume 515 in inlet 510 prior to entering engine core 420 and/or ensure any FOD traveling through the inlet 510 is detected.

Figure 4B:
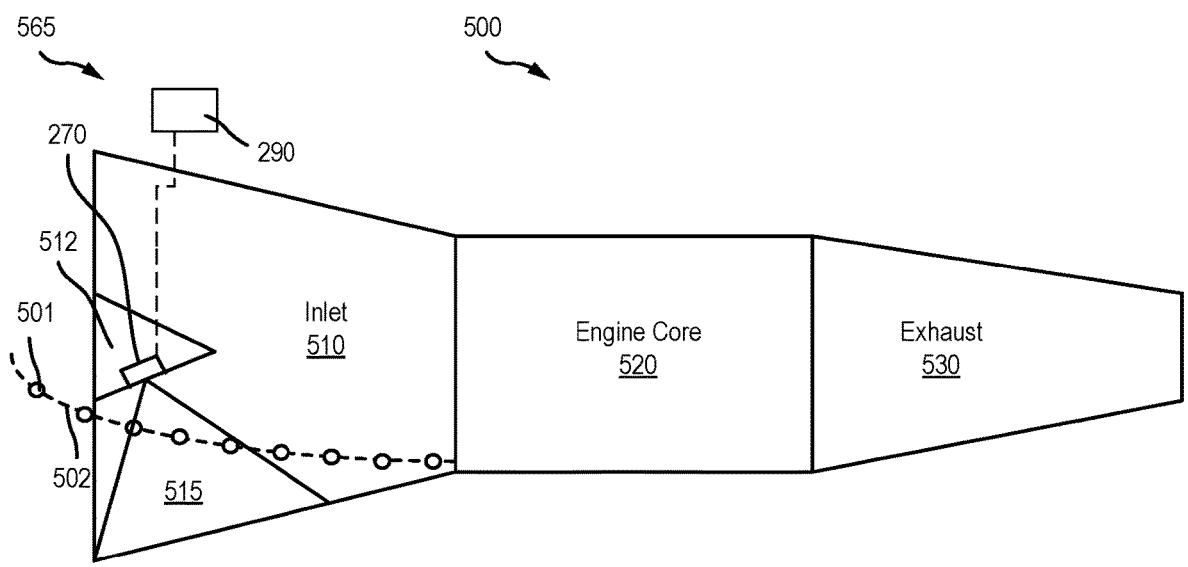
FIG. 4B illustrates a cross-section, schematic view of a gas turbine engine during operation, in accordance with various embodiments.

Referring now to FIG. 4B, a FOD detection system 565 for a gas turbine engine 500 during use is illustrated. In various embodiments, LiDAR sensor assembly 270 is configured to scan a pre-determined volume 515 within an inlet 310 of a gas turbine engine 500. In various embodiments, the LiDAR sensor assembly 270 may comprise a transceiver, a transmitter and receiver, or the like. The LiDAR sensor assembly 270 may be configured to rapidly transmit light. The light may be transmitted in various directions and define a pre-determined volume 515 in inlet 510. The light transmitted from the LiDAR sensor assembly 270 may reflect off an inner surface of inlet 510 and return to the LiDAR sensor assembly 270. The LiDAR sensor assembly 270 may be configured to receive the returned light via a transceiver, a receiver, or the like. The LiDAR sensor assembly 270 may be configured to measure the time it takes for the emitted light to travel to the inner surface of inlet 410 and/or the fan section 422 and back. The time may be used to calculate a distance via LiDAR sensor assembly 270.

By LiDAR sensor assembly 270 scanning throughout pre-determined volume 515 in the inlet 510 and rotating about centerbody 512, the LiDAR sensor may define a spatial relation of inlet 510 in the pre-determined volume 515 during normal operation of gas turbine engine 400. In doing so, LiDAR sensor assembly 270 may be configured to identify, detect, and/or track FOD 501 that enters inlet 510 along a FOD path 502 and travels through the pre-determined volume 515. The LiDAR sensor assembly 270 may be configured to target a local area within pre-determined volume 515 of inlet 510 when LiDAR sensor detects FOD 501. In doing so, LiDAR sensor may more accurately map and/or track FOD 501 as it travels along FOD path 502 and enters engine core 520.

In various embodiments, a gas turbine engine may comprise a plurality of LiDAR assemblies. The LiDAR sensor assemblies from FIGS. 2A-4B may be used in any combination and be within the scope of this disclosure. As such, using a plurality of LiDAR sensor assemblies may allow tracking of FOD from entering the inlet until the FOD reaches the engine core. A LiDAR sensor assembly 270 may be disposed anywhere in inlet 410 and be within the scope of this disclosure. The LiDAR sensor assembly 270 may be configured to track any FOD that enters an inlet of a gas turbine engine as disclosed herein.

Figure 5:
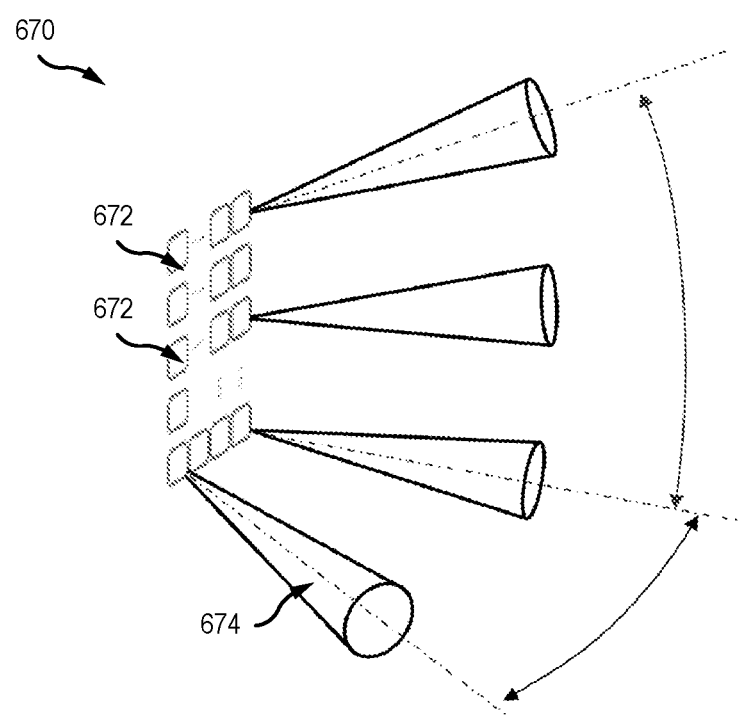
FIG. 5 illustrates a light detection and ranging (LiDAR) sensor assembly, in accordance with various embodiments.

Referring now to FIG. 5, a LiDAR sensor assembly 670, in accordance with various embodiments, is illustrated. LiDAR sensor assembly 670 comprises a plurality of transceivers 672. In various embodiments, the plurality of transceivers 672 may be arranged in an array. Each transceiver in the plurality of transceivers 672 may be aimed in a different direction. The plurality of transceivers 672 may be arranged to define a pre-determined volume to be scanned. Each transceiver may be configured to output a pulsed beam. The angle and/or width of each pulsed beam in the plurality of pulsed beams 674 may be defined by a resolution of the respective pulsed beam. In various embodiments, each pulsed beam in the plurality of pulsed beams 674 may have the same resolution. In various embodiments, a corresponding FOD detection processor in a respective FOD detection system may increase a resolution of a first portion of beams in the plurality of pulsed beams 674 and decrease a resolution of a second portion of beams in the plurality of pulsed beams 674 in response to detecting FOD proximate the first portion of beams. In other words, the enhanced resolution of the pulsed beams directed proximate the FOD may more accurately track the FOD as it travels towards an engine core.

In various embodiments, each transceiver in the plurality of transceivers 672 are fixed. Each transceiver may scan its respective direction at the same time as an adjacent transceiver, or each transceiver may scan its respective direction sequentially following an adjacent transceiver. In various embodiments, LiDAR sensor assembly 270 in FIGS. 2A-4B may be in accordance with LiDAR sensor assembly 670.

Figure 6:
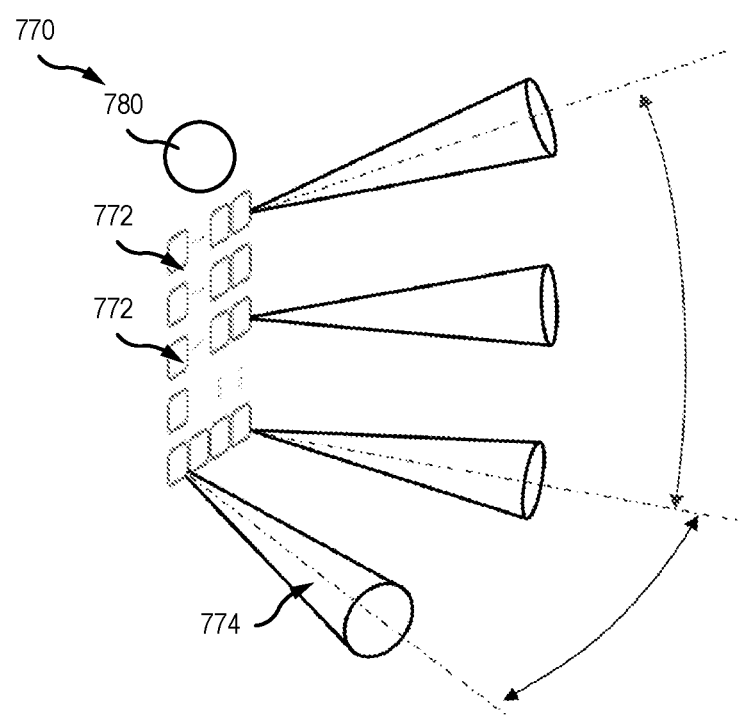
FIG. 6 illustrates a light detection and ranging (LiDAR) sensor assembly, in accordance with various embodiments.

Referring now to FIG. 6, a LiDAR sensor assembly 770, in accordance with various embodiments, is illustrated. LiDAR sensor assembly 770 comprises a plurality of transmitters 772 and a receiver 780. In various embodiments, the plurality of transmitters 772 may be arranged in an array. Each transmitter in the plurality of transmitters 772 may be aimed in a different direction. The plurality of transmitters 772 may be arranged to define a pre-determined volume to be scanned. Each transmitter may be configured to output a pulsed beam. The angle and/or width of each pulsed beam in the plurality of pulsed beams 774 may be defined by a resolution of the respective pulsed beam. In various embodiments, each pulsed beam in the plurality of pulsed beams 774 may have the same resolution. In various embodiments, a corresponding FOD detection processor in a respective FOD detection system may increase a resolution of a first portion of beams in the plurality of pulsed beams 774 and decrease a resolution of a second portion of beams in the plurality of pulsed beams 774 in response to detecting FOD proximate the first portion of beams. In other words, the enhanced resolution of the pulsed beams directed proximate the FOD may more accurately track the FOD as it travels towards an engine core.

In various embodiments, each transmitter in the plurality of transmitters 772 are fixed. Each transmitter may scan its respective direction sequentially following an adjacent transceiver. By scanning each transmitter in the plurality of transmitters 772 sequentially, the receiver can correlate the return beam to a respective transmitter in the plurality of transmitters 772. In various embodiments, LiDAR sensor assembly 270 in FIGS. 2A-4B may be in accordance with LiDAR sensor assembly 770.

Figure 7:
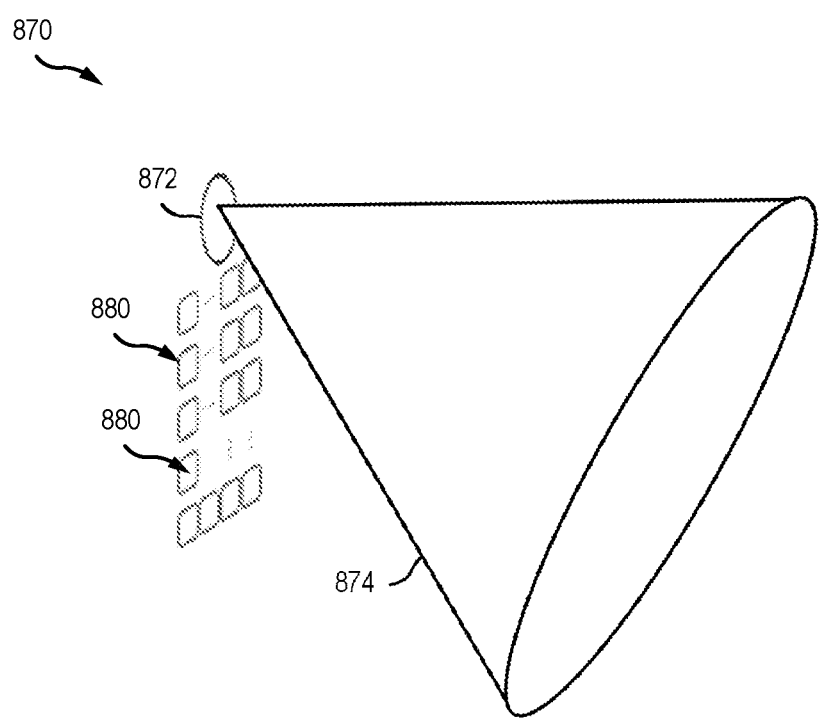
FIG. 7 illustrates a light detection and ranging (LiDAR) sensor assembly, in accordance with various embodiments.

Referring now to FIG. 7, a LiDAR sensor assembly 870, in accordance with various embodiments, is illustrated. LiDAR sensor assembly 870 comprises a plurality of receivers 880 and a transmitter 872. In various embodiments, the plurality of receivers 880 may be arranged in an array. Each receiver in the plurality of receivers 880 may be aimed in a different direction. The plurality of receivers 880 may be arranged to cover and/or define a pre-determined volume to be scanned. The transmitter 872 may be configured to output a non-directional pulsed beam 874. The angle and/or width of the pulsed beam may be defined by a resolution of the respective pulsed beam and configured to provide a return to each receiver in the plurality of receivers 880.

In various embodiments, each receiver in the plurality of receivers 880 and the transmitter 872 are fixed. The transmitter 872 may scan the volume illuminated by the non-directional pulsed beam. Each receiver in the plurality of receivers 880 may be aligned in a pre-defined direction. A scan of the volume of non-directional pulsed beam 874 may be achieved after each pulse. In various embodiments, LiDAR sensor assembly 270 in FIGS. 2A-4B may be in accordance with LiDAR sensor assembly 870.

In various embodiments, LiDAR sensor assembly 270 in FIGS. 2A-4B may comprise a single transceiver configured to scan a respective predefined volume by scanning in various directions. The various directions of the transceiver may create a grid in the respective predefined volume and detect FOD by determining any changes to the spatial relationships in the predefined volume.

Figure 8:
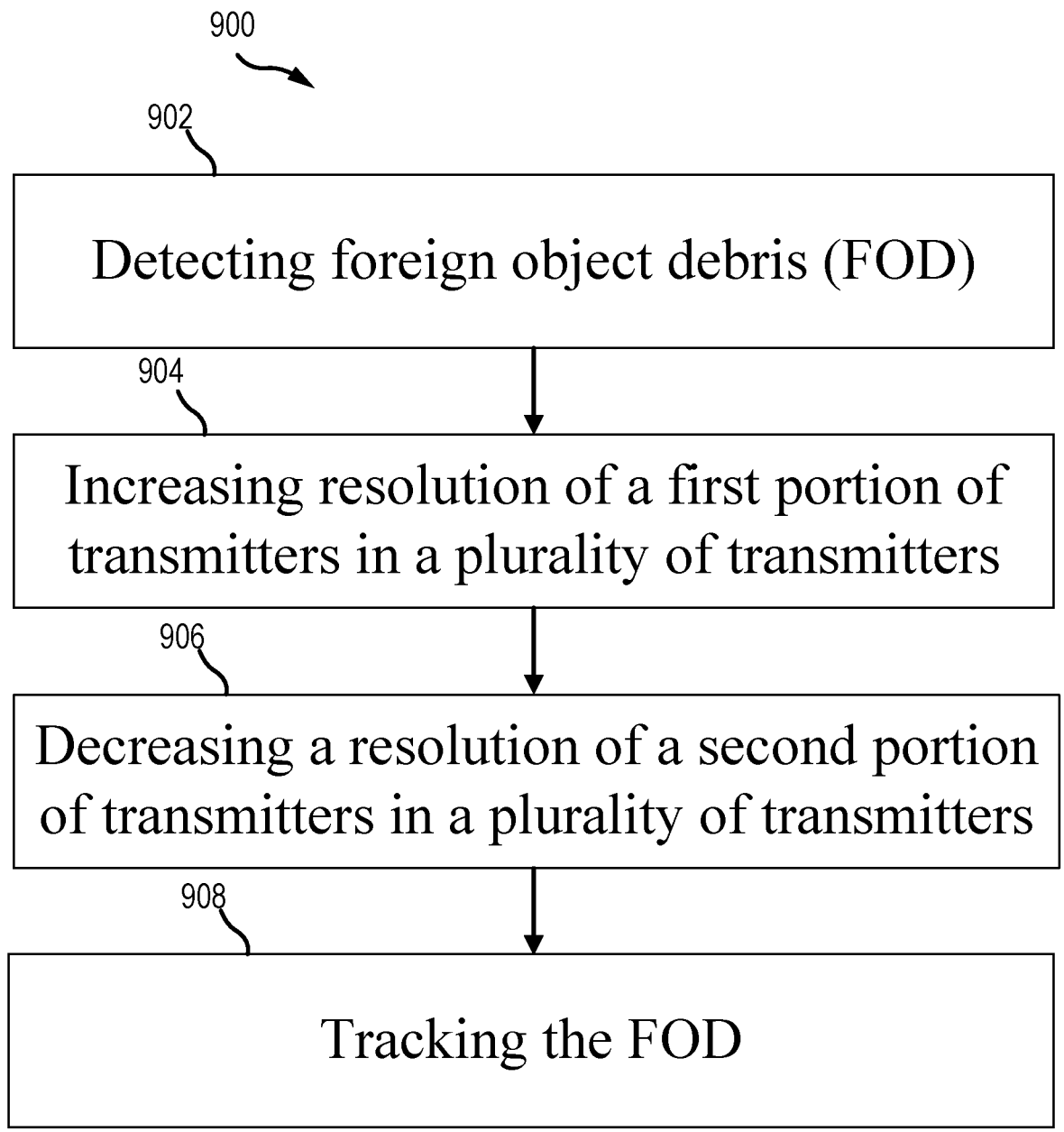
FIG. 8 illustrates a method of using a foreign object debris (FOD) detection system of a gas turbine engine, in accordance with various embodiments.

Referring now to FIG. 8, a method 900 of using a FOD detection system for a gas turbine engine, in accordance with various embodiments, is illustrated. The method comprises detecting foreign object debris (FOD) (step 902). The FOD may be detected by a plurality of transmitters or a plurality of transceivers from a LiDAR sensor assembly. The FOD may first be detected by a respective transmitter or transceiver in the plurality of transmitters or the plurality of transceivers. In response to the respective transmitter or transceiver detecting the FOD, a resolution of a first portion of transmitters or transceivers that are adjacent to the respective transmitter or receiver may be increased (step 904).

The method 900 may further comprise decreasing a resolution of a second portion of transmitters or transceivers (step 906). The second portion of transmitters or transceivers are mutually exclusive from the first portion of transmitters or receivers. The method 900 may further comprise tracking the FOD via the first portion of transmitters or transceivers (step 908). By increasing the resolution of the transmitters or transceivers that reflect off the FOD, the path of the FOD may more accurately be detected, while maintaining the amount of power consumption of the FOD detection system.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment.

Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine comprising:
a nacelle at least partially defining a boundary of an inlet of the gas turbine engine;
a fan section disposed aft of the inlet;
a foreign object debris (FOD) detection system mounted to a radially inner surface of the nacelle; the FOD detection system comprising a light detection and ranging (LiDAR) sensor assembly configured to scan a pre-determined volume within the inlet; and
a FOD detection processor electrically coupled to the LiDAR sensor assembly, the FOD detection processor configured to transfer a control signal to increase a resolution in a local area of a tracking zone in response to detecting FOD in the local area.

2. The gas turbine engine of claim 1, wherein the LiDAR sensor assembly comprises a single transceiver configured to scan the pre-determined volume within the inlet.

3. The gas turbine engine of claim 1, wherein the LiDAR sensor assembly comprises a plurality of transceivers, wherein each transceiver in the plurality of transceivers is fixed, the plurality of transceivers configured to scan the pre-determined volume.

4. The gas turbine engine of claim 3, wherein the plurality of transceivers are disposed in an array.

5. The gas turbine engine of claim 1, wherein the LiDAR sensor assembly further comprises a plurality of transmitters and a receiver, each transmitter in the plurality of transmitters configured to emit a pulsed beam sequentially following an adjacent transmitter in the plurality of transmitters.

6. The gas turbine engine of claim 5, wherein the plurality of transmitters are disposed in an array.

7. The gas turbine engine of claim 1, wherein the LiDAR sensor assembly further comprises a plurality of receivers and a transmitter, wherein each receiver is configured to detect a reflection from a pre-determined direction.

8. The gas turbine engine of claim 7, wherein the plurality of receivers are disposed in an array.

9. A gas turbine engine comprising:
an engine core;
an inlet disposed forward of the engine core, the inlet comprising a centerbody;
a foreign object debris (FOD) detection system mounted to the centerbody; the FOD detection system comprising a first light detection and ranging (LiDAR) sensor assembly configured to scan a first pre-determined volume within the inlet, the first pre-determined volume defining at least one of a first volume forward of the centerbody and a second volume radially outward of the centerbody, wherein the first LiDAR sensor assembly is configured to detect and track FOD during operation of the gas turbine engine; and
a FOD detection processor electrically coupled to the first LiDAR sensor assembly, wherein the first LiDAR sensor assembly comprises a plurality of transceivers, wherein the FOD detection processor is configured to increase a first resolution of a first portion of transceivers in the plurality of transceivers in response to a transceiver in the plurality of transceivers detecting the FOD.

10. The gas turbine engine of claim 9, further comprising a second LiDAR sensor assembly coupled to the centerbody.

11. The gas turbine engine of claim 10, wherein the first pre-determined volume is the first volume.

12. The gas turbine engine of claim 10, wherein the second LiDAR sensor assembly is configured to scan a second pre-determined volume, and wherein the second pre-determined volume is the second volume.

13. The gas turbine engine of claim 9, wherein the first LiDAR sensor assembly is configured to detect and track FOD during operation of the gas turbine engine.

14. The gas turbine engine of claim 9, wherein the FOD detection processor is configured to decrease a second resolution of a second portion of transceivers in the plurality of transceivers in response to the transceiver in the plurality of transceivers detecting the FOD, the second portion of transceivers being different than the first portion of transceivers.

15. A gas turbine engine, comprising:
an engine core;
an inlet disposed forward of the engine core, the inlet comprising a centerbody;
a foreign object debris (FOD) detection system mounted to the centerbody; the FOD detection system comprising a first light detection and ranging (LiDAR) sensor assembly configured to scan a first pre-determined volume within the inlet, the first pre-determined volume defining at least one of a first volume forward of the centerbody and a second volume radially outward of the centerbody, wherein the first LiDAR sensor assembly is configured to detect and track FOD during operation of the gas turbine engine; and a FOD detection processor electrically coupled to the first LiDAR sensor assembly, wherein the first LiDAR sensor assembly comprises a plurality of transmitters and a receiver, wherein the FOD detection processor is configured to increase a first resolution of a first portion of transmitters in the plurality of transmitters in response to a transmitter in the plurality of transmitters detecting the FOD.

16. The gas turbine engine of claim 15, wherein the FOD detection processor is configured to decrease a second resolution of a second portion of transmitters in the plurality of transmitters in response to the transmitter in the plurality of transmitters detecting the FOD, the second portion of transmitters being different than the first portion of transmitters.

17. A method of using a foreign object debris (FOD) detection system for a gas turbine engine, the method comprising:
   detecting FOD in an inlet of the gas turbine engine;
   increasing a first resolution of a first portion of transmitters or receivers in a plurality of transmitters or transceivers; and
   tracking the FOD through a pre-determined volume defined by the plurality of transmitters or transceivers.

18. The method of claim 17, further comprising decreasing a second resolution of a second portion of transmitters or transceivers in the plurality of transmitters or transceivers, the second portion of transmitters or transceivers being different than the first portion of transmitters or transceivers.

* * * * *